(12) United States Patent
Vantipalli et al.

(10) Patent No.: US 11,573,779 B2
(45) Date of Patent: Feb. 7, 2023

(54) CREATING AND UPGRADING OF SOLUTIONS FOR DEPLOYMENT IN A VIRTUALIZED COMPUTING ENVIRONMENT

(71) Applicant: VMware, Inc., Palo Alto, CA (US)

(72) Inventors: Janakiram Vantipalli, Santa Clara, CA (US); Anjaneya Prasad Gondi, Fremont, CA (US); Aravinda Haryadi, Bangalore (IN); Raghavendra Subbarao Narahari Venkata, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 48 days.

(21) Appl. No.: 17/116,818

(22) Filed: Dec. 9, 2020

(65) Prior Publication Data
US 2022/0179634 A1    Jun. 9, 2022

(51) Int. Cl.
*G06F 8/61* (2018.01)
*G06F 9/455* (2018.01)
*G06F 8/41* (2018.01)
*G06F 8/71* (2018.01)

(52) U.S. Cl.
CPC ............... *G06F 8/63* (2013.01); *G06F 8/433* (2013.01); *G06F 8/71* (2013.01); *G06F 9/45533* (2013.01)

(58) Field of Classification Search
CPC ... G06F 8/63; G06F 8/71; G06F 8/433; G06F 8/45533; G06F 9/45533
See application file for complete search history.

(56) References Cited

U.S. PATENT DOCUMENTS

| | | | |
|---|---|---|---|
| 7,076,496 B1* | 7/2006 | Ruizandrade | G06F 8/71 707/999.102 |
| 8,813,062 B1* | 8/2014 | Eminovic | G06F 8/61 717/172 |
| 9,047,160 B2* | 6/2015 | Adi | G06F 8/63 |
| 10,244,081 B2* | 3/2019 | Ananthanarayanan | G06F 9/5072 |
| 11,157,253 B1* | 10/2021 | Shteyman | G06F 8/71 |

(Continued)

OTHER PUBLICATIONS

Angrish et al., "A flexible data schema and system architecture for the virtualization of manufacturing machines (VMM)", 2017, Elsevier Ltd. (Year: 2017).*

(Continued)

*Primary Examiner* — Wei Y Zhen
*Assistant Examiner* — Junchun Wu
(74) *Attorney, Agent, or Firm* — Kim & Stewart LLP

(57) ABSTRACT

A method of creating a software image of a solution to be deployed in a virtualized computing environment includes: retrieving a schema of the solution and determining from the schema software products that are required by the solution and software features that are required by the solution; for each software product, selecting a version of the software product to include in the solution and identifying software features provided by the selected version of the software product; and upon confirming that the selected versions of the software products provide all of the software features that are required, creating the software image of the solution that includes the selected version of each of the software products, and saving the software image in a storage device for deployment in the virtualized computing environment.

16 Claims, 13 Drawing Sheets

(56) References Cited

U.S. PATENT DOCUMENTS

| | | | | |
|---|---|---|---|---|
| 2006/0168573 A1* | 7/2006 | Clark | ................. | G06F 8/71 717/162 |
| 2006/0200590 A1* | 9/2006 | Pereira | ................. | G06F 8/63 710/8 |
| 2011/0055811 A1* | 3/2011 | Ananthanarayanan | ... | G06F 8/71 717/120 |
| 2011/0265082 A1* | 10/2011 | Ashok | ................. | G06F 9/45533 718/1 |
| 2011/0302570 A1* | 12/2011 | Kurimilla | ................. | G06F 8/60 717/170 |
| 2012/0137278 A1* | 5/2012 | Draper | ................. | G06F 8/65 717/170 |
| 2012/0192185 A1* | 7/2012 | Ashok | ................. | G06F 9/45558 718/1 |
| 2013/0132956 A1* | 5/2013 | Ashok | ................. | G06F 8/63 718/1 |
| 2013/0297922 A1* | 11/2013 | Friedman | ................. | G06F 8/63 713/2 |
| 2020/0150995 A1* | 5/2020 | Chastain | ................. | G06F 9/45533 |
| 2020/0259901 A1* | 8/2020 | Puleston | ................. | H04W 4/38 |
| 2021/0089384 A1* | 3/2021 | Eberlein | ................. | G06F 11/0709 |
| 2021/0311717 A1* | 10/2021 | Haryadi | ................. | G06F 8/65 |
| 2021/0311766 A1* | 10/2021 | Haryadi | ................. | G06F 9/44505 |

OTHER PUBLICATIONS

Konstantinou et al., "An Architecture for Virtual Solution Composition and Deployment in Infrastructure Clouds", Jun. 2009, ACM (Year: 2009).*

Younge et al., "Analysis of Virtualization Technologies for High Performance Computing Environments", 2011, IEEE (Year: 2011).*

Chieu et al., "Solution-based Deploymentof Complex Application Services on a Cloud", 2010, IEEE (Year: 2010).*

Welivita et al., "Virtual Product Try-On Solution for E-Commerce Using Mobile Augmented Reality", 2017, Springer, pp. 438-447 (Year: 2017).*

U.S. Appl. No. 16/939,117, filed Jul. 27, 2020, 27 pages.

* cited by examiner

CREATING AND UPGRADING OF SOLUTIONS FOR DEPLOYMENT IN A VIRTUALIZED COMPUTING ENVIRONMENT

BACKGROUND

In many virtualization computing systems, virtualization software is installed on a cluster of hosts using an ISO image that is created from a flat list of software installation bundles (SIBs). An SIB is the smallest unit of software that can be shipped and installed, and these SIBs make up, for example, a base hypervisor image (hereinafter also referred to as "base image") from a virtualization software provider, as well as drivers, agents, and other software components from an OEM (original equipment manufacturer) and other vendors of hardware. In a typical installation, hundreds of these SIBs are packaged as one or more ISO images and installed in the hosts.

After installation, lifecycle management of the virtualization software becomes cumbersome and error-prone for several reasons. First, although different software developers create new versions or updates to the SIBS, the new versions or updates cannot be released independently. The releases have to be tightly controlled because it is likely that one SIB has a dependency to another SIB. As a result, new releases are made in the form of bulletins, which are a collection of software installation bundles, or as a new ISO image in which new SIBs from the virtualization software provider, the OEM, and other software vendors are packaged. Because of the inter-dependencies and the integration of the newly developed SIBs with other SIBs, it is difficult to make piecemeal changes to the virtualization software for easy consumption by an end user during the lifecycle of the virtualization software.

Furthermore, new releases come in many different forms. A complete release, e.g., a GA (general availability) release, may be made with an ISO image or a bulletin. The bulletin may be employed for partial releases as well, including rollup, patch, update, and extension. Very few end users understand the differences among these different types of partial releases and there are no clear rules that establish when and how a bulletin should be created for a particular type of release.

Consequently, over time, changes to the virtualization software are layered on top of each other and the final image of the virtualization software is not easily captured or described. Worse, history becomes a factor in that past bulletins may have included other SIBs, not overridden in later bulletins. For these reasons, the overall content is difficult to capture or describe, and the end user is unable to answer the question, "What is the current state of the virtualization software configured in each of the hosts in the cluster?" As such, if there is a particular desired state of the virtualization software that the user is interested in, the end user will have no way of knowing whether the current state is compliant with the desired state and, if not, how to make the current state compliant with the desired state.

Accordingly, software developers have delivered simpler ways to manage the lifecycle of virtualization software, as disclosed in U.S. patent application Ser. No. 16/939,117, filed Jul. 27, 2020, the entire contents of which are incorporated by reference herein. As customers are deploying various solutions (e.g., a low latency networking solution or a high-performance storage solution) in virtualized computing environments, there is an increasing need to ensure that these solutions are functionally compatible and interoperable with the virtualization software and provide all of the features expected by the customers once deployed in the virtualized computing environments.

SUMMARY

One or more embodiments provide methods to create a software image of a solution to be deployed in a virtualized computing environment. In one embodiment, a new software image of the solution is created and saved for deployment in the virtualized computing environment after it is confirmed that the software image as created is able to provide all of the features required by the solution. In another embodiment, an updated software image of the solution is created in response to a proposed software upgrade and saved for deployment in the virtualized computing environment after it is confirmed that the updated software image is able to provide all of the features required by the solution.

A method of creating a software image of a solution, according to an embodiment, includes: retrieving a schema of the solution and determining from the schema software products that are required by the solution and software features that are required by the solution; for each software product, selecting a version of the software product to include in the solution and identifying software features provided by the selected version of the software product; and upon confirming that the selected versions of the software products provide all of the software features that are required, creating the software image of the solution that includes the selected version of each of the software products, and saving the software image in a storage device for deployment in the virtualized computing environment.

A method of updating a software image of a solution in response to a proposed software upgrade, according to an embodiment, includes: upon detecting the proposed software upgrade, retrieving a schema of the solution and determining from the schema software features that are required by the solution, and retrieving the software image of the solution that has been deployed in the virtualized computing environment; updating the software image of the solution based on the proposed software upgrade and identifying software features provided by the updated software image; and upon confirming that the updated software image provides all of the software features that are required, permitting the proposed software upgrade and saving the updated software image in a storage device for deployment in the virtualized computing environment.

Further embodiments include a non-transitory computer-readable storage medium comprising instructions that cause a computer system to carry out the above method, as well as a computer system configured to carry out the above method.

DETAILED DESCRIPTION

Figure 1:
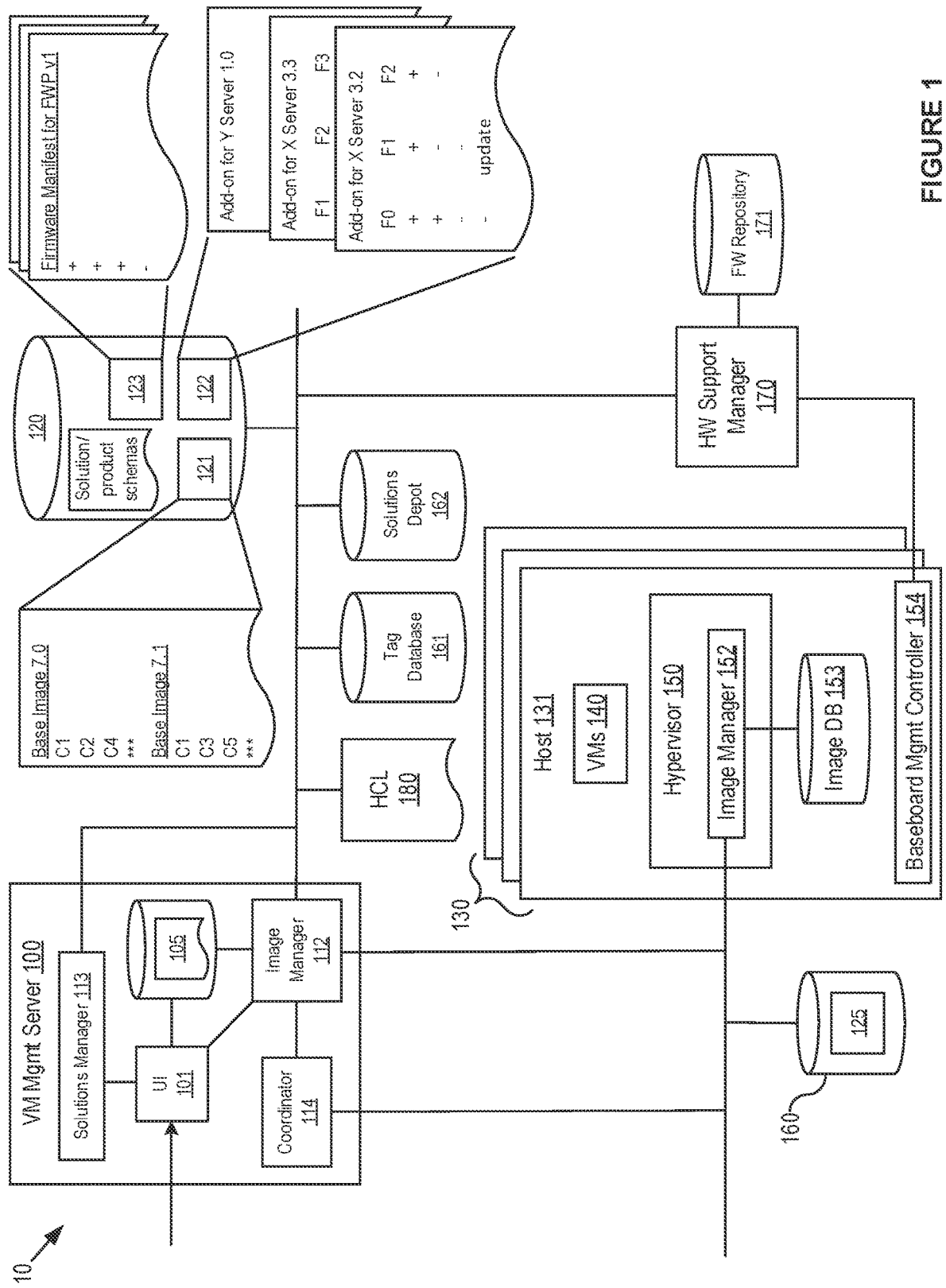
FIG. 1 is a block diagram of a virtualized computing system in which embodiments may be carried out.

As described herein, SIBs, more generally referred to herein as payloads, are logically grouped into "components." In the embodiments, a component is a unit of shipment and installation, and a successful installation of a component typically will appear to the end user as enabling some specific feature. For example, if a software vendor wants to ship a user-visible feature that requires a plug-in, a driver, and an agent, the software vendor will create separate payloads for each of the plug-in, the driver, and the agent, and then group them together as one component. From the end user's perspective, it is sufficient to install this one component onto a server to enable this feature on the server. A component may be part of another software image, such as a base image or an add-on, as further described below, or it may be a stand-alone component provided by a third-party or the end user (hereinafter referred to as "user component").

A "base image" is a collection of components that are sufficient to boot up a server with the virtualization software. For example, the components for the base image includes a core kernel component and components for basic drivers and in-box drivers. The core kernel component is made up of a kernel payload and other payloads that have inter-dependencies with the kernel payload. The collection of components that make up the base image may be packaged and released as one unit.

An "add-on" or "add-on image" is a collection of components that the OEM wants to bring together to customize its servers. Using add-ons, the OEM can add, update or remove components that are present in the base image. The add-on is layered on top of the base image and the combination includes all the components that are necessary to customize, boot up and monitor the OEM's servers. Although an "add-on" is always layered on top of a base image, the add-on content and the base image content are not tied together. As a result, an OEM is able to independently manage the lifecycle of its releases. In addition, end users can update the add-on content and the base image content independently of each other.

"Solutions" are software that are enabled to provide discrete features and functionalities. Example solutions include HA (high availability), which provides failover protection against hardware and system software outages within the cluster of hosts, virtual center (VC), which provides various tools for managing virtual machines running in the cluster of hosts, a virtual network (e.g., VMware NSX®) to which virtual machines running in the cluster of hosts can connect, and virtual storage area network (VSAN), which allows virtual storage resources to be provisioned from local hard disk drives and/or solid state drives of individual hosts in the cluster. Solutions run independently of the image of the virtualization software but require certain components to be present in the image of the virtualization software. In the embodiments, the end-user can enable a solution in a user interface but does not decide what components of the solution to install. Instead, after the solution has been enabled by the end user, an image manager (described below) determines what components of the solution to install based on constraints of the solution.

FIG. 1 is a block diagram of a virtualized computing system 10 that implements a desired state model for managing the lifecycle of virtualization software. System 10 includes a cluster of hosts 131 which may be constructed on a server grade hardware platform such as an x86 architecture platform. The hardware platform includes one or more central processing units (CPUs), system memory, e.g., random access memory (RAM), and one or more network interface controllers (NICs). A virtualization software layer, also referred to herein as a hypervisor 150, is installed on top of the hardware platform. Hypervisor 150 supports a virtual machine execution space within which multiple VMs 140 may be concurrently instantiated and executed.

In the embodiment illustrated in FIG. 1, hosts 131 access shared storage 160 through their NICs. In another embodiment, each host 131 contains a host bus adapter (HBA) through which input/output operations (IOs) are sent to shared storage 160. Shared storage 160 may comprise, e.g., magnetic disks or flash memory in a storage area network (SAN). In some embodiments, hosts 131 also contain local storage devices (e.g., hard disk drives or solid-state drives), which may be aggregated and provisioned as a virtual SAN device.

VM management server 100 is a physical or virtual server that communicates with hypervisor 150 of each host 131 to provision VMs 140 from the hardware resources of host 131. VM management server 100 logically groups hosts 131 into a cluster 130 to provide cluster-level functions, such as load balancing across cluster 130 by performing VM migration between hosts 131, distributed power management, dynamic VM placement according to affinity and anti-affinity rules, and high-availability. The number of hosts 131 in the cluster may be one or many and three are depicted in FIG. 1.

In the desired state model, the end user expresses the desired state of the virtualization software (i.e., hypervisor 150) for the cluster of hosts through a UI 101 of VM management server 100. One example form for expressing the desired state is a software specification 105, which is generated based on selections made through UI 101. The selections that can be made through UI 101 include (1) base image, (2) add-on, (3) solution, (4) user component(s), and (5) firmware package (see FIG. 2). Image manager 112 consumes software specification 105 to composite a desired image that is modeled as a hierarchical software stack, including (1) the base image, which is the lowest layer of the software stack, (2) the add-on, which is layered on top of the base image, (3) firmware manifest corresponding to the selected firmware package in the layer above the add-on, and then on the top (4) solution components and (5) other user components.

In the embodiments, (1) metadata and payloads of components, (2) metadata of base images, add-ons, firmware packages (in the form of a firmware manifest 123), and solutions, and (3) files that define constraints of solutions, are published in image depot 120. As depicted in FIG. 1, metadata 121 for base images include metadata for "Base Image 7.0," Which include components, C1, C2, C4, etc. and metadata for "Base Image 7.1," which include components, C1, C3, C5, etc. FIG. 1 also depicts metadata 122 for add-ons for a family of servers, F1, F2, and F3, where the "+" symbols represent components being added to the base image and the "–" symbols represent components being deleted from the base image, while "update" represents a component in the base image that is being updated. As shown in metadata 122, for each family of servers, there can be different components that are added to, deleted from, and/or updated in the base image. Thus, different add-ons can have different dependencies. Firmware manifest 123 specifies components that are to be added on top of the base image and the add-on (depicted with a + symbol in FIG. 1) and components that are to be removed from the base image and the add-on (depicted with a – symbol in FIG. 1), so that drivers, agents, and other software components corresponding to the selected firmware package become part of the image of the virtualization software. In alternative embodiments, separate depots, e.g., in the form of file servers, are set up by OEMs to store metadata and payloads of components that the OEMs publish.

Figure 4:
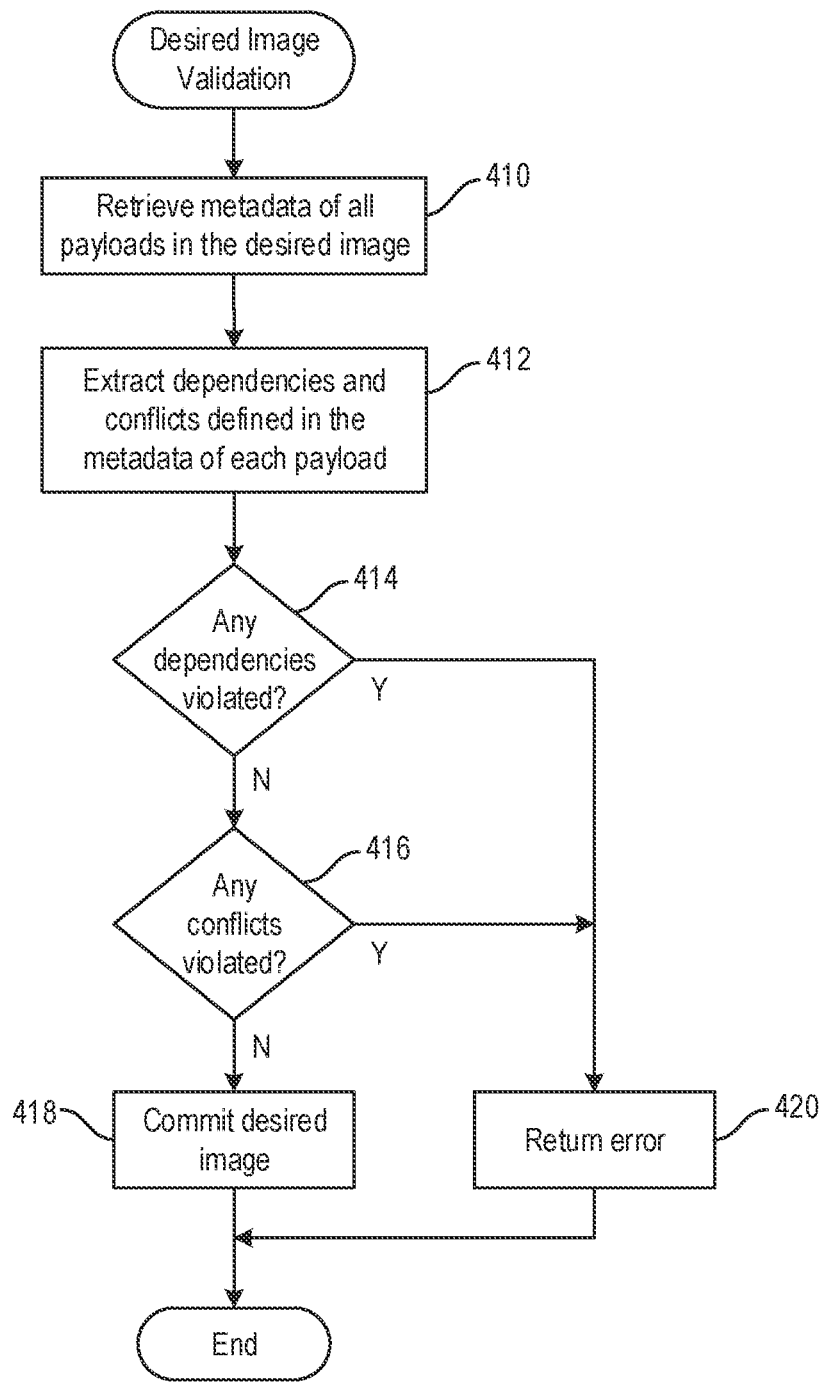
FIG. 4 is a flow diagram of steps carried out to perform validation of the desired image.

After image manager 112 composites the image of the virtualization software, image manager 112 validates the composited image in accordance with the method depicted in FIG. 4 and, if validated, stores the composited image in shared storage 160 as a desired image 125 that is to be installed in each host 131, and hands off control to coordinator 114. Coordinator 114 communicates with image manager 152 of each of hosts 131 through an API call to install desired image 125 in each of hosts 131. Once image manager 152 installs desired image 125, it stores the metadata of the installed image of the virtualization software in image database 153. Going forward, image database 153 of each host 131 operates as the single source of truth for the state of the virtualization software configured in that host, and will record any changes to the state of the virtualization software in image database 153.

Coordinator 114 also communicates with a hardware support manager 170 through an API call to install the firmware in hosts 131. In response to the API call, hardware support manager 170 retrieves the firmware from firmware repository 171 and stages the firmware in hosts 131. Then, the firmware staged in each host 131 is installed in the host by a corresponding baseboard management controller 154.

Hardware support manager 170 is a firmware management software running in a physical or a virtual server that exposes various APIs. The APIs include: (1) an "apply/remediate" API call to install in hosts 131 the firmware specified by the firmware manifest in desired image 125 or to remediate the firmware currently installed in hosts 131 to bring the firmware into compliance, (2) a "list" API to list all of the firmware packages that hardware support manager 170 is supporting, (3) a "scan" API to compare the current state of the firmware running in hosts 131 with the firmware specified by the firmware manifest in desired image 125, (4) a "firmware inventory" API to report a current state of the firmware running in hosts 131, (5) a "pre-check" API to confirm that it is possible to upgrade the firmware currently installed in hosts 131 to the firmware specified by the firmware manifest in desired image 125, and (6) a "stage" API to retrieve the firmware specified by the firmware manifest in desired image 125 and store them in a cache memory of hosts 131 for immediate installation upon receiving an apply or remediate API call. With these APIs, the end user is able to manage the image of the virtualization software installed in hosts 131 and the firmware installed in hosts 131 from a single "pane of glass," in this case, through UI 101 of VM management server 100.

Before desired image 125 is actually installed in hosts 131, image manager 112 performs a validation against a hardware compatibility list (HCL) 180. The goal of this validation, more specifically referred to herein as an HCL validation, is to make sure that desired image 125 which is going to be deployed in hosts 131 is compatible with the hardware devices in hosts 131. HCL 180 contains a list of all hardware devices installed in hosts 131, and identifies for each such hardware device all versions of device firmware and drivers that are compatible therewith. Validation is successful if the versions of the firmware and drivers in desired image 125 are listed in HCL 180 as compatible versions.

VM management server 100 further includes a solutions manager 113. Solutions manager 113 is software executed in VM management server 100 to generate software images of the solutions from solution schemas and product schemas that are published in image depot 120. As product schemas are published in image depot 120 and as software images of the solutions are generated, solutions manager 113 updates a tag database 161 to track software features that are provided by different products and solutions. After generating the software images, solutions manager 113 stores the software images of the solutions in solutions depot 162. Solution schemas and product schemas are further described below in conjunction with FIG. 11.

Figure 2:
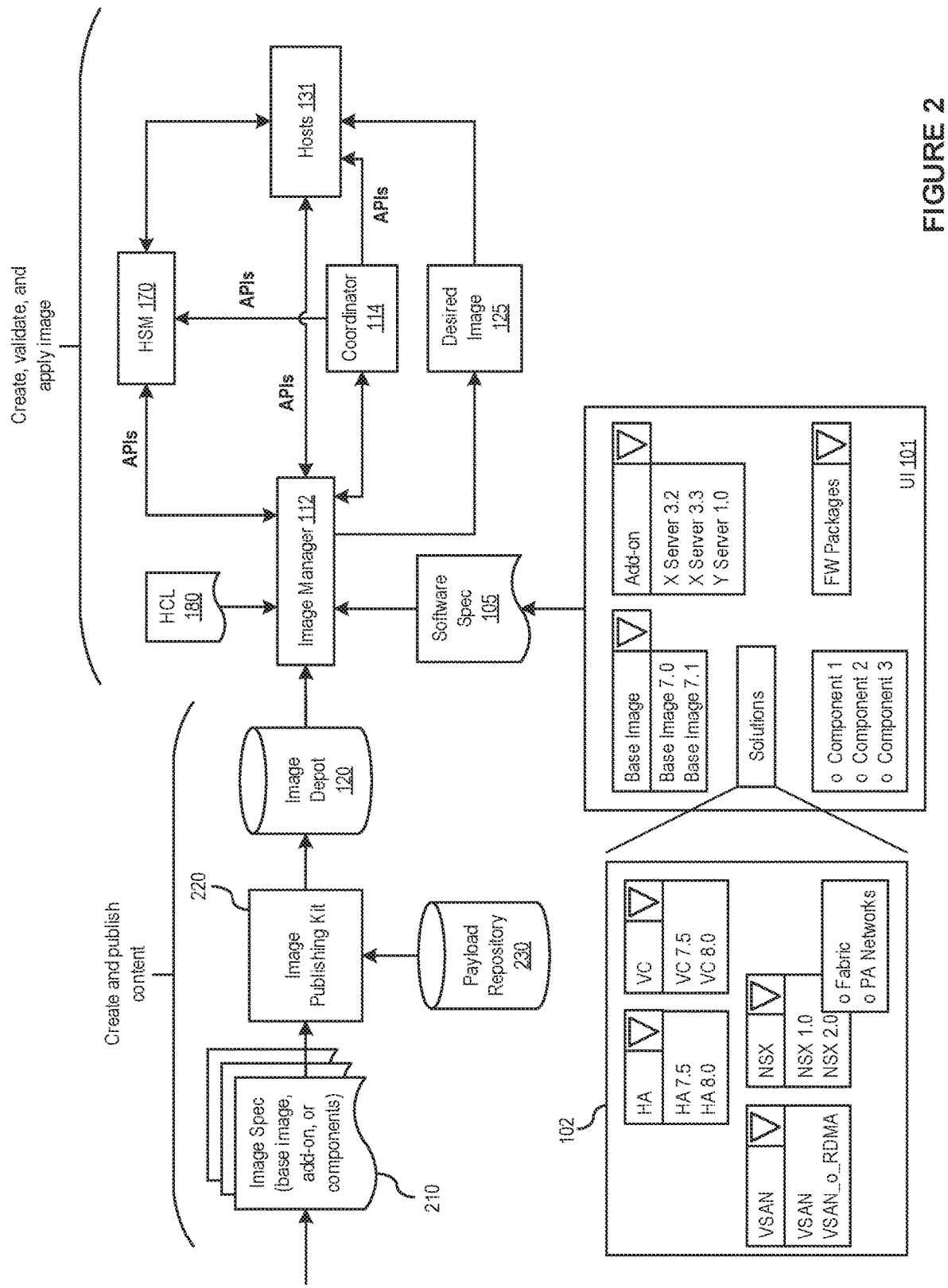
FIG. 2 is a conceptual diagram that illustrates a flow of steps carried out by different components of the virtualized computing system to create and apply a desired image of the virtualization software.

FIG. 2 is a conceptual diagram that illustrates a flow of steps carried out by different components of the virtualized computing system to create and apply a desired image of the virtualization software. The first part of FIG. 2 depicts steps for creating content and publishing them in image depot 120. Typically, the creator of the base image is the provider of the virtualization software, e.g., VMware, Inc., and the creator of the add-on is the OEM, which is the provider of the physical servers that are configured as hosts 131. The creator of components may be the provider of the virtualization software, the OEM, or another software developer (e.g., in the case of user components).

Components are defined in an image specification 210 as a collection of payloads, which are stored in payload repository 230, and an image publishing kit 220 pulls in the payloads of the components from payload repository 230 and publishes them in image depot 120 along with the metadata of the published components. Components published in this manner may be a component of a base image, a component of an add-on, a firmware component, a solution component, or a user component.

The provider of the virtualization software defines the components that make up the base image in an image specification 210, and image publishing kit 220 publishes the metadata of the base image in image depot 120. In the example depicted in FIG. 1, the metadata of the base image for "Base 7.0" and the metadata of the base image for "Base 7.1" are published in image depot 120.

OEMs define the content of their add-ons in image specifications 210, and image publishing kit 220 publishes the metadata of the add-ons in image depot 120. In the example depicted in FIG. 1, the metadata of add-ons for a family of servers (e.g., F1, F2, and F3 of Server 3.0) are published in image depot 120. OEMs also define the content of firmware components, and image publishing kit 220 publishes the metadata of these components in image depot 120. OEMs also define the content of their firmware packages, in the form of a firmware manifest.

Different user components and solutions are also defined in image specifications 210. Image publishing kit 220 publishes the metadata and components of the user components, and the metadata, components, and constraints of the different solutions in image depot 120.

The second part of FIG. 2 depicts steps for creating, validating, and applying the desired image. After payloads and metadata of base images, add-ons, firmware components, solutions, and user components have been published in image depot 120, the end user is able to define software specification 105 for the desired image of the virtualization software through UI 101. UI 101 includes different sections for selecting a base image, add-on, solution, firmware package, and one or more user components. Software specification 105 is generated based on the selections the end user makes through UI 101.

In the embodiments illustrated herein, solutions are enabled by the end user through a solutions user interface (UI) 102, which is accessed by clicking on the solutions button on UI 101. Solutions UI 102 includes drop-down menus for selecting and enabling different versions of solutions. In the example given herein, versions of the following solutions can be selected and enabled through solutions UI 102: HA, VC, NSX, and VSAN. For the NSX solution, the end user is prompted to further select components to add, e.g., the "fabric" component, the "PA Networks" component, or both. The two versions of VSAN solution that can be enabled are shown as VSAN, which represents VSAN over normal transport, e.g., TCP, and VSAN_o_RDMA, which represents VSAN over RDMA transport, which is a higher speed transport than TCP transport.

Figure 7:
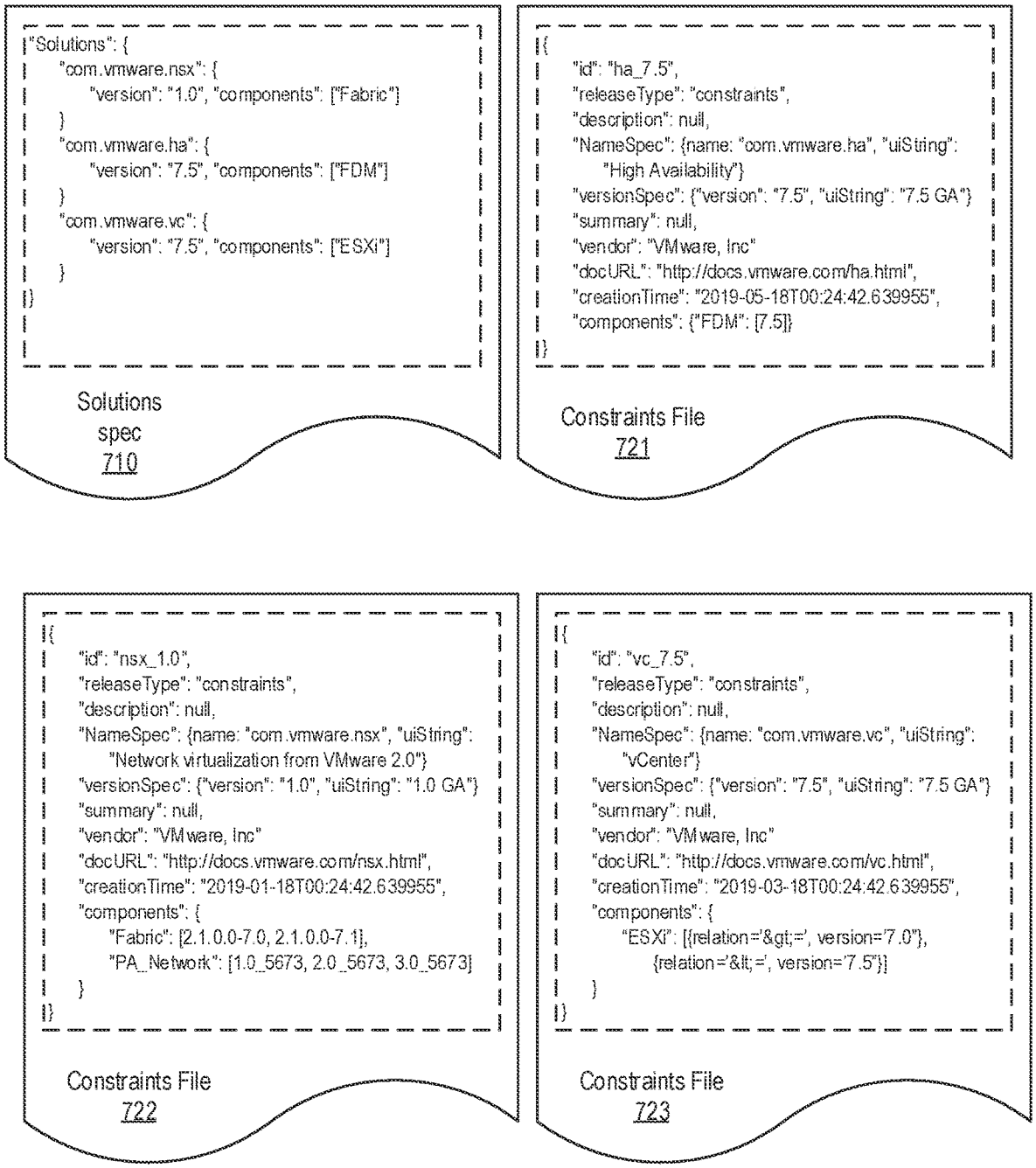
FIG. 7 illustrates an example of a solutions spec and a plurality of files that define constraints of various solutions that can be added to the solutions spec.

After software specification 105 is generated, image manager 112 parses it to determine the selections of the base image, add-on, solution, firmware package, and one or more user components made by the end user. The solution section of software specification 105 is illustrated in FIG. 7 as solution spec 710 and described below. Then, image manager 112 retrieves the metadata corresponding to the selected base image, the selected add-on, and the enabled solution(s) from image depot 120, determines the firmware manifest corresponding to the selected firmware package, and composites an image of the virtualization software as a hierarchical software stack, as described above. Image manager 112 then validates the composited image as described below in conjunction with FIG. 4, and commits the validated composited image of the virtualization software as desired image 125 in shared storage 160.

Figure 3:
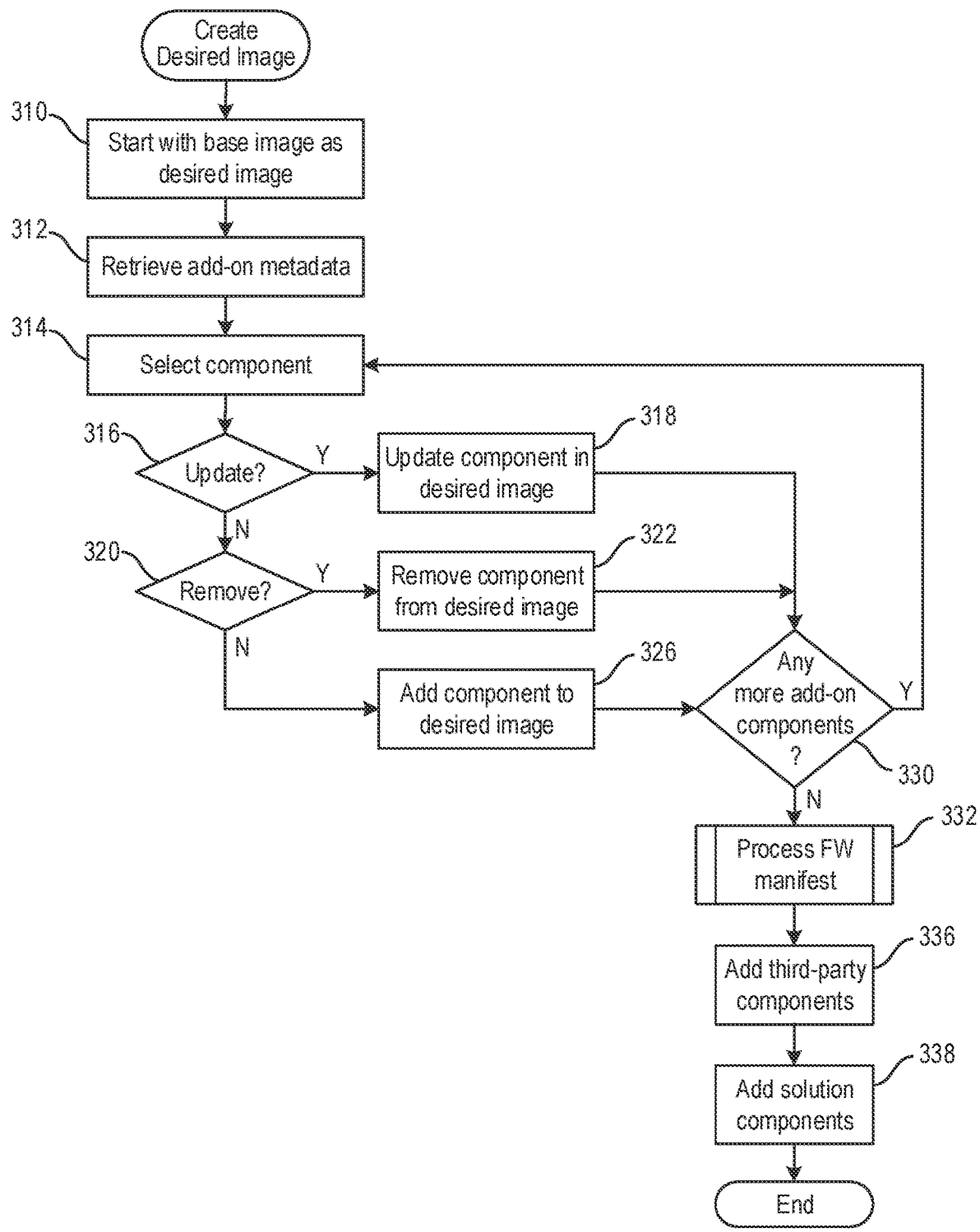
FIG. 3 is a flow diagram of steps carried out to create the desired image of the virtualization software.

FIG. 3 is a flow diagram of steps carried out by image manager 112 to create the desired image of the virtualization software. The method of FIG. 3 begins at step 310, where image manager 310 starts with the metadata of the selected base image as the desired image. Then, at step 312, image manager 310 retrieves the metadata of the selected add-on and parses the metadata of the selected add-on for components.

At step 314, image manager 112 selects a component to process. If the component is to be updated as determined at step 316, image manager 112 updates the metadata of the component in the desired image at step 318. If the component is to be removed as determined at step 320, image manager 112 removes the metadata of the component from the desired image at step 322. If the component is to be neither updated nor removed, it is added to the desired image at step 326. If there are any more add-on components to process, as determined at step 330, the process returns to step 314, where another component is selected for processing.

If there are no more add-on components to process, as determined at step 330, image manager 112 at step 332 processes the firmware manifest corresponding to the selected firmware package to add and remove components in the same manner as the selected add-on was processed. Then, image manager 112 adds to the desired image and one or more user components selected by the user at step 336 and components for the enabled solution(s) at step 338.

FIG. 4 is a flow diagram of steps carried out by image manager 112 to perform validation of the desired image. The method of FIG. 4 begins at step 410 at which image manager 112 retrieves metadata of all payloads in the desired image. Then, at step 412, image manager 112 parses the retrieved metadata to extract all dependencies and conflicts defined therein. Image manager 112 executes steps 414 and 416 to determine if any dependencies or conflicts are violated by the payloads that make up the desired image. If there are no such violations, the desired image is committed at step 418 as stored in shared storage 160 as desired image 125. On the other hand, if there is any violation, an error is returned at step 420.

Figure 5:
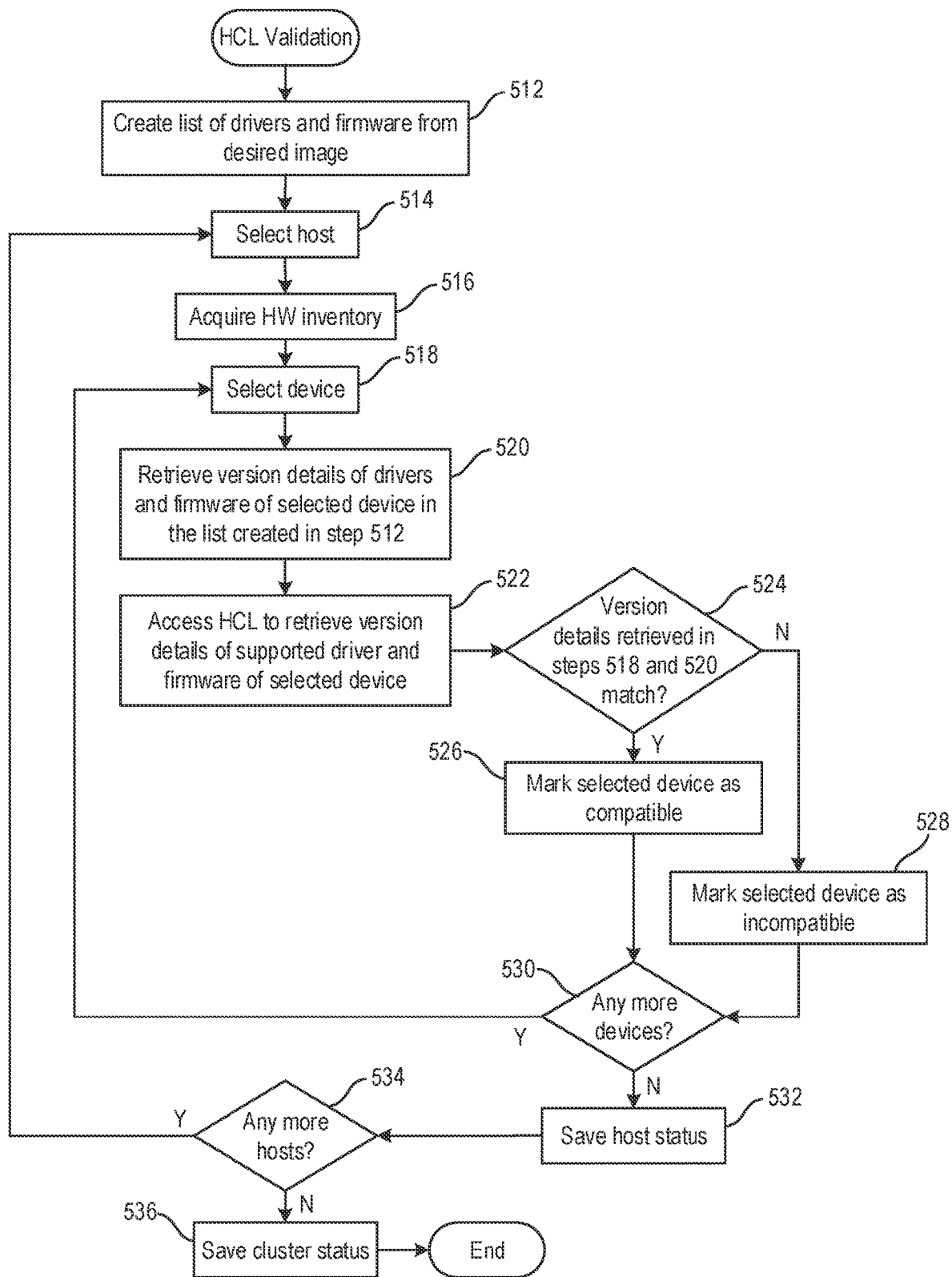
FIG. 5 is a flow diagram of steps carried out to perform validation against a hardware compatibility list.

FIG. 5 is a flow diagram of steps carried out by image manager 112 to perform validation of the desired image of the virtualization software against HCL 180. The method of FIG. 5 begins at step 512 at which image manager 112 creates a list of firmware and drivers that are in desired image 125, along with their version numbers. At step 514, image manager 112 selects a host against which HCL validation is performed. Steps 516, 518, 520, 522, 524, 526, 528, 530, 532, and 534 are executed each time a new host is selected at step 514.

At step 516, image manager 112 acquires the hardware inventory of the host, e.g., from a hardware discovery service that is running in VM management server 100. Then, at step 518, image manager 112 selects a unique device in the hardware inventory. Steps 520, 522, 524, 526, 528, and 530 are executed each time a new unique device is selected at step 518. At step 520, image manager 112 retrieves version details of drivers and firmware of the selected device in the list created at step 512. Then, at step 522, image manager 112 accesses HCL 180 to retrieve version details of supported driver and firmware of the selected device. The version details of the drivers and firmware retrieved at step 520 and the version details of the drivers and firmware retrieved at step 522 are then compared at step 524. If there is a match, i.e., the version details of the drivers and firmware retrieved at step 520 can be found in the version details of the drivers and firmware retrieved at step 522, the selected device is marked as compatible at step 526. On the other hand, if there is no match, i.e., the version details of the drivers and firmware retrieved at step 520 cannot be found in the version details of the drivers and firmware retrieved at step 522, the selected device is marked as incompatible at step 528.

If it is determined at step 530 that there is another unique device in the hardware inventory, the process returns to step 518, where image manager 112 selects the next unique device in the hardware inventory. If it is determined at step 530 that there is no other unique device in the hardware inventory, the process proceeds to step 532, at which image manager 112 saves the status for the selected host. If any of the devices were marked as incompatible at step 528, the selected host is marked as incompatible at step 532. If all of the devices were marked as compatible at step 528, the selected host is marked as compatible at step 532.

At step 532, if it is determined that HCL validation has not been carried out for all of hosts 131, the process returns to step 514, where image manager 112 selects the next host for HCL validation. If not, the process proceeds to step 536, at which image manager reads the status of all the hosts in the cluster and saves the status for the entire cluster. If any of the hosts of the cluster were marked as incompatible at step 532, the cluster is marked as incompatible at step 536. If all of the hosts of the cluster were marked as compatible at step 532, the cluster is marked as compatible at step 536. After step 536, the process ends.

Figure 6:
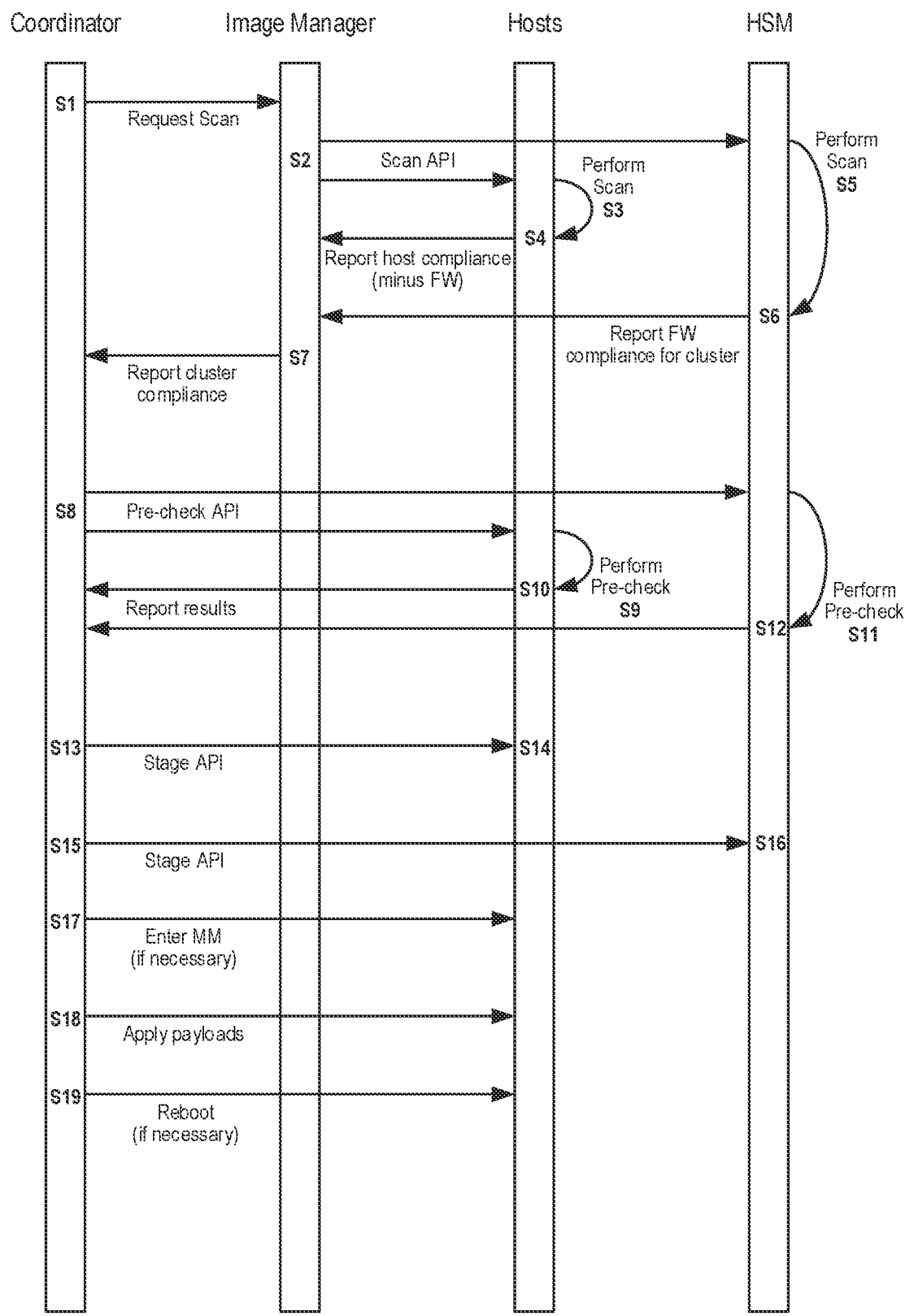
FIG. 6 is a command sequence diagram that depicts a process for applying the desired image of the virtualization software to hosts of the virtualized computing system.

After desired image 125 is validated, committed, and stored in shared storage 160 and after it passes HCL validation, desired image 125 can be applied to hosts 131. Referring back to FIG. 2, image manager 112 transfers control for applying desired image 125 to coordinator 114. The process for applying desired image 125 is depicted in FIG. 6. FIG. 6 is a command sequence diagram that depicts a process for applying the desired image of the virtualization software to hosts of the virtualized computing system. The process includes the following subprocesses: (1) scan, (2) pre-check, (3) stage, and (4) apply.

The scan subprocess is represented by steps S1 to S7. Coordinator 114 initiates the scan subprocess by making the request to image manager 112 at step S1. In response, image manager 112 at step S2 issues a scan API to image manager 152 of each host 131 and a scan API to hardware support manager 170. The scan API includes a storage location of desired image 125.

In response to the scan API, image manager 152 at step S3, accesses desired image 125 and retrieves the current state of the virtualization software from image database 153, and compares the two to determine if each item of desired image 125 other than the firmware manifest is "incompatible" (which means that desired image 125 cannot be applied, e.g., when the current state is running a higher version of an item), "compliant" (which means that the current state matches the desired state), non-compliant (Which means that the current state can be upgraded to the desired state), or unknown (which means that a comparison of the current state could not be made with the item in desired image 125 because the item in desired image 125 is unknown or not recognizable). At step S4, image manager 152 of each host 131 sends back a compliance report indicating one of four aforementioned compliance states, and for each item that is non-compliant, also reports on the impact on the host to which desired image 125 will be applied, i.e., whether the host needs to enter into a maintenance mode or needs to be rebooted.

In response to the scan API, hardware support manager 170 at step S5, accesses desired image 125 to extract the firmware manifest in desired image 125, and for each host 131, determines whether or not the firmware specified by the firmware manifest is incompatible, compliant, non-compliant, or unknown with respect to the firmware currently installed in each host 131. At step S6, hardware support manager 170 prepares a firmware compliance report per host, and sends back the firmware compliance report per host to image manager 112. The firmware compliance report per host indicates "incompatible" if the host has installed therein firmware that is of a higher version that that specified by the firmware manifest, "compliant" if the host has installed therein the firmware specified by the firmware manifest, "non-compliant" if the host has installed therein firmware that is of a lower version than that specified by the firmware manifest, or "unknown" if the firmware manifest specifies firmware that is either unknown or not recognizable. If the compliance state is "non-compliant" for any host, the firmware compliance report for that host also indicates the impact on the host, i.e., whether the host needs to enter into a maintenance mode or needs to be rebooted. In cases where hardware support manager 170 supports downgrading of the firmware, the firmware compliance report will indicate "non-compliant" instead of "incompatible" if the host has installed therein firmware that is of a higher version that that specified by the firmware manifest.

Upon receipt of the compliance reports, image manager 112 prepares a per-host compliance report based on the compliance report sent from the host at step S4 and a firmware compliance report for the cluster sent from hardware support manager 170 at step S6. Then, image manager 112 generates a cluster level compliance report based on all of the per-host compliance reports from hosts 131 and the firmware compliance report for the cluster sent from hardware support manager 170. At step S7, image manager 112 sends back both the per-host compliance report (which also indicates the impact on the host), and the cluster level compliance report to coordinator 114.

The pre-check subprocess is represented by steps S8 to S12. Coordinator 114 at step S8 issues a pre-check API to image manager 152 of each host 131 and to hardware support manager 170. In response to the pre-check API, image manager 152 of each host 131 at step S9 accesses desired image 125 and retrieves the current state of the virtualization software from image database 153, and compares the two to determine whether or not the virtualization software in the host is compliant or can be upgraded to desired image 125 at that time, and performs several other checks on the host and at step S10 sends the results of the checks to coordinator 114. The other checks include whether or not the host can enter into maintenance mode at that time and a check on the operational health of the host. Similarly, in response to the pre-check API, hardware support manager 170 at step S11 performs a check on each host 131 to determine whether or not the firmware in the host is compliant or can be upgraded to the firmware specified by the firmware manifest in desired image 125 at that time, and at step S12 sends the results of this check to coordinator 114. A pre-check might fail for firmware if higher versions of firmware are already installed, or if the combination of drivers in the image and the firmware specified by the firmware manifest would be incompatible (e.g. if the end user overrode a component in a way that is incompatible with the firmware specified by the firmware manifest). There may also be hardware-specific reasons the firmware specified by the firmware manifest cannot be applied (e.g., defects in system that need repair, lack of resources for the firmware in baseboard management controller 154, etc.)

Coordinator 114 determines whether or not to proceed with the application of desired image 125 to hosts 131 based on the results of the pre-check. For example, if the operational health of one of the hosts 131 is bad, coordinator 114 will not proceed with the application of desired image 125 to hosts 131. Upon determining to proceed with the application of desired image 125 to hosts 131, coordinator 114 executes the stage subprocess.

The stage subprocess is represented by steps S13 to S16. Coordinator 114 at step S13 issues a stage API to image manager 152 of each host 131, and at step S15 issues a stage API to hardware support manager 170. In response, image manager 152 at step S14 pulls in the payloads of desired image 125 from the storage location of desired image 125 and caches them in local memory or cache of the host. At step S16, hardware support manager 170 pulls in payloads of the firmware specified by the firmware manifest in desired image 125 from firmware repository 171 and caches them in local memory or cache of the host.

After staging the payloads, coordinator 114 at step S17 instructs each host 131 to enter into maintenance mode if the cluster compliance report indicates that the maintenance mode is required to bring hosts 131 into compliance. In response to such an instruction (if issued), hosts 131 enter into maintenance mode.

The apply subprocess follows step S17. This subprocess is represented by S18. At step S18, coordinator 114 issues an apply API to each host 131. This API causes image manager 152 of each host 131 to update the current state of the virtualization software with the payloads of desired image 125 staged at step S14 and the payloads of the firmware staged at step S16. Also, at step S18, image manager 152 updates metadata of the virtualization software that is stored in image database 153 to reflect that the virtualization software in the host and the associated firmware have been updated to be compliant with desired image 125.

At step S19, coordinator 114 instructs each host 131 to reboot if the cluster compliance report indicates that hosts 131 are required to be rebooted to bring the virtualization software in the host and the associated firmware into compliance. In response to such an instruction (if issued), hosts 131 undergo a reboot.

Further, in the embodiments described above, the end user carries out the process of FIG. 6 to "remediate" the hosts. The remediation process may be executed, in one embodiment, to bring the cluster of hosts back into compliance with the desired state of the virtualization software specified in software specification 105. In another embodiment, the process is carried out to deliver and install a new desired image of the virtualization software that is generated from software specification 105. The process of FIG. 6 includes the scan subprocess, the pre-check subprocess, the stage subprocess, and the apply subprocess, but some of the subprocesses, e.g., the scan subprocess and the pre-check subprocess, may be executed on its own, independently of the process of FIG. 6.

FIG. 7 illustrates a solutions spec 710, which is an example of a solution section of software specification 105, and a plurality of constraints files 721-723 that define constraints of solutions that have been added to solutions spec 710. The solutions added to solutions spec 710 include HA version 7.5, VC version 7.5, and NSX version 1.0. Solutions spec 710 also identifies for each added solution one or more components that are required to enable the solution. The components that are required to enable the solution are specified in a solution schema which is published in image depot 120 (e.g., solution schema 1111 shown in FIG. 11), and may also be specified by the end user through UI 102 as described above.

Figure 8:
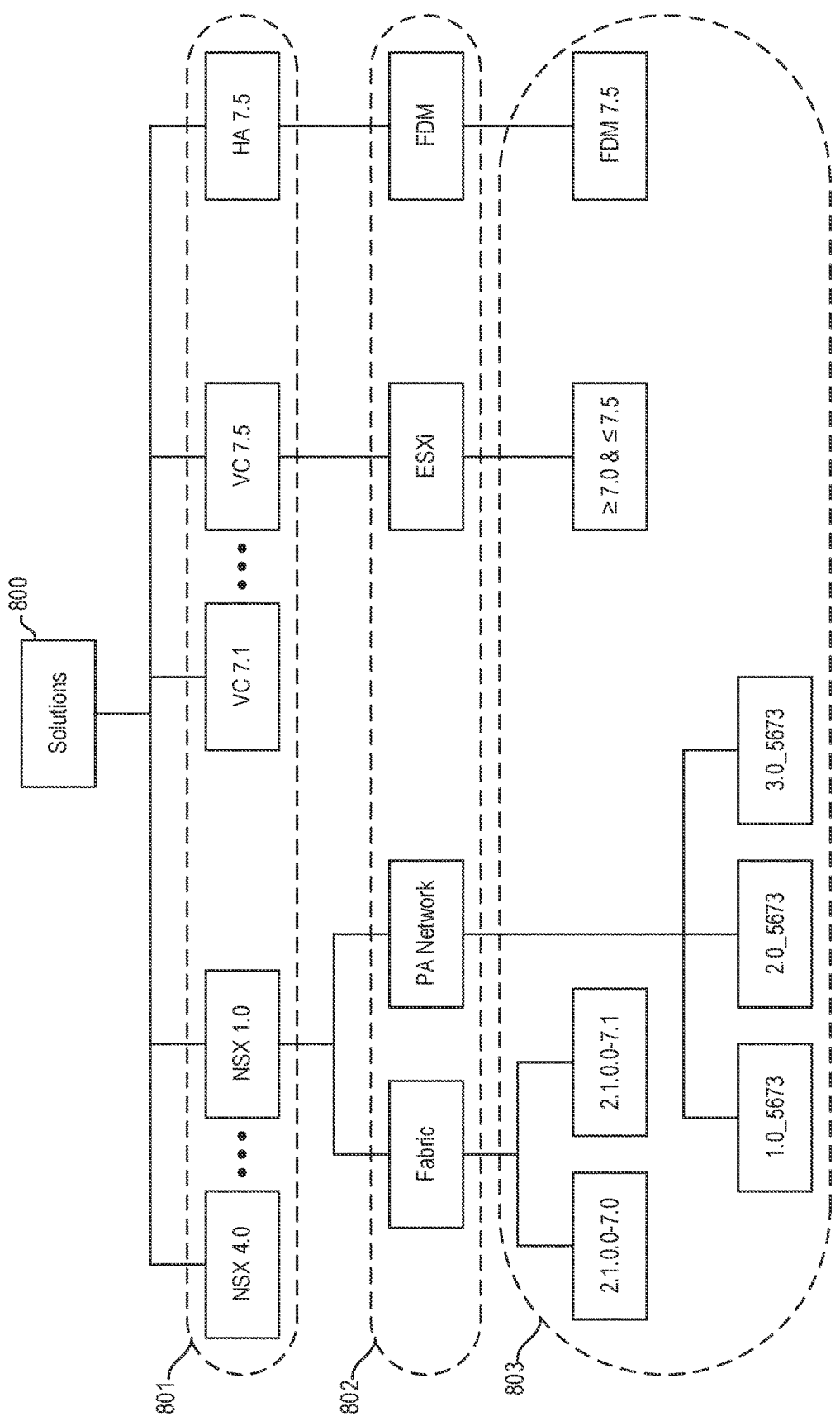
FIG. 8 is a diagram that depicts how compatible solution components are selected.

FIG. 8 is a diagram that depicts how compatible solution components are determined. The diagram in FIG. 8 is a hierarchical tree structure in which root node 800 represents all of the solutions that can be enabled. The first level 801 under root node 800 includes intermediate nodes representing the selection and enabling of particular versions of solutions, e.g., through solutions UI 102. The second level 802 under the first level 801 includes intermediate nodes representing components of solutions. The third level 803 under the second level 802 includes leaf nodes which illustrate particular versions of solution components, one or more of which may be determined to be compatible according to the constraints of the solutions.

Figure 9:
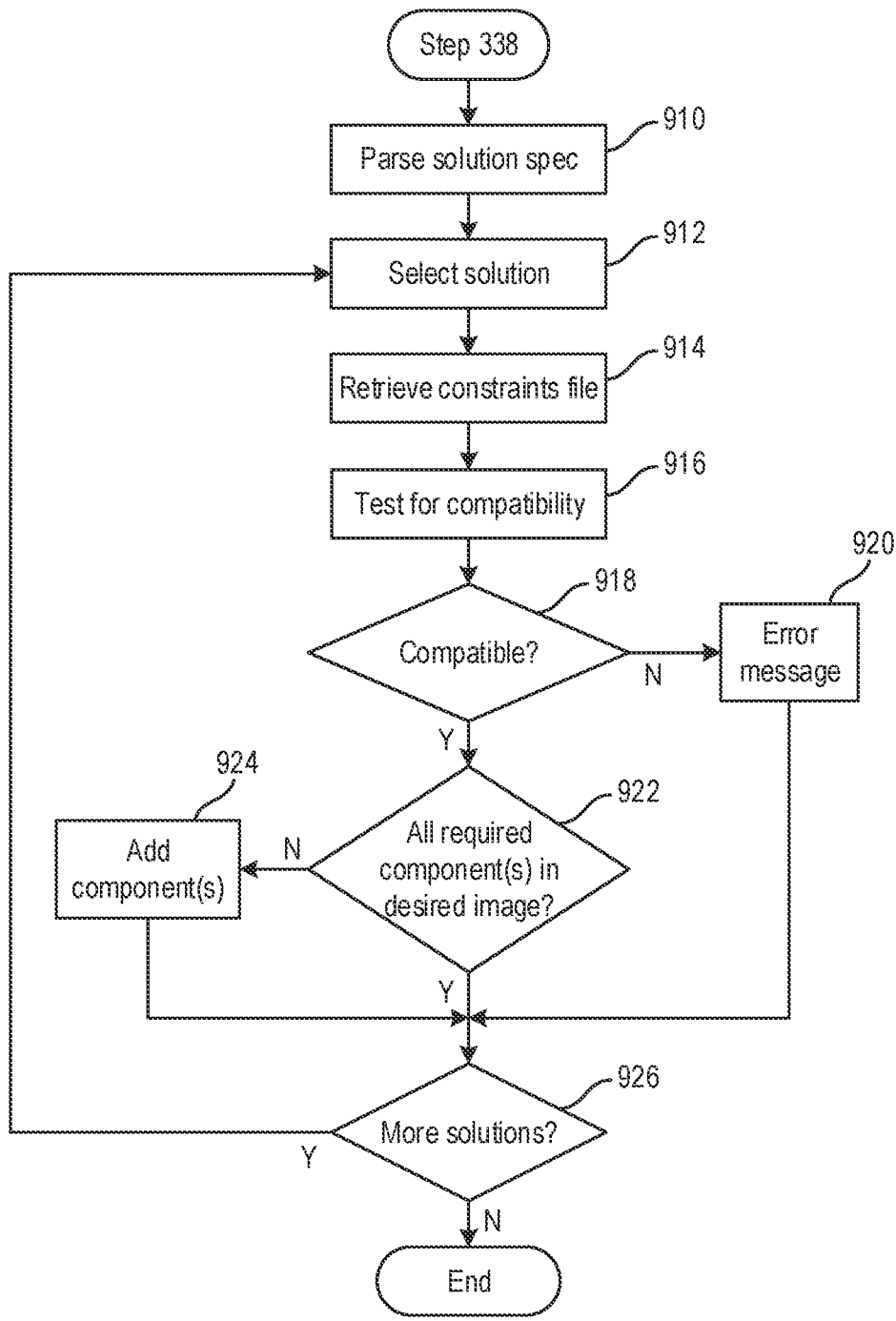
FIG. 9 is a flow diagram that depicts steps of a method for selecting a compatible version of solution components.

FIG. 9 is a flow diagram that depicts steps of a method for selecting a compatible version of solution components. This method is executed by image manager 112 as part of step 338 of FIG. 3, and may be executed when a solution is enabled for the first time and while image manager 112 is compositing a desired image of the virtualization software (which is before the desired image of the virtualization software is applied onto the hosts) or when the end user is upgrading the solution by enabling a higher version of the solution than that which is currently enabled (e.g., by selecting HA version 8.0 to enable on solutions UI 102 when HA version 7.5 is currently enabled).

The method of FIG. 9 begins with step 910, where image manager 112 retrieves software specification 105 and parses the solution section of software specification 105 to identify the solutions that the end user has enabled and one or more components of the enabled solutions that need to be included in the image of the virtualization software. For example, if the solution section of software specification 105 is solutions spec 710 shown in FIG. 7, image manger 112 identifies the enabled solutions as NSX version 1.0, HA version 7.5, and VC version 7.5, and the components of the enabled solutions as: fabric component for NSX version 1.0, FDM component for HA version 7.5, and ESXi component for VC version 7.5.

Then, step 912 and the steps following step 912 are executed for each enabled solution identified in step 910. Image manager 112 at step 912 selects one of the enabled solutions and at step 914 retrieves the constraints file associated with the selected solution. For example, image manager 112 retrieves constraints file 721 for HA version 7.5, constraints file 722 for NSX version 1.0, and constraints file 723 for VC version 7.5. Then, image manager 112 at step 916 runs a test for compatibility.

For some enabled solutions (e.g., HA version 7.5 and NSX version 1.0), the test for compatibility includes identifying components specified in the constraints file and determining their compatibility with the current version of the base image. In some cases, a component's compatibility with a particular version of the base image is hard coded in the metadata of the component and so the compatibility of the component with the current version of the base image may be determined by examining the component's metadata. In cases where a component's compatibility with a particular version of the base image is not hard coded in the metadata of the component, image validation similar to the image validation depicted in FIG. 4 is carried out to determine the component's compatibility with the current version of the base image. For example, the component is combined with the current version of the base image, and the combined image undergoes an image validation using the method depicted in FIG. 4. If the combined image passes this image validation, then that component is deemed to be compatible with the current version of the base image. If multiple versions of a component are specified in the constraints file and they are each compatible with the current version of the base image, it is preferable to select the most recent version of the compatible versions as the version to include in the desired image of the virtualization software. Accordingly, in cases where a component's compatibility with a particular version of the base image is not hard coded in the metadata of the component and multiple versions of the component are specified in the constraints file, the versions are checked for compatibility using image validation described above in order of their publication dates (from the most recent to the least recent), so that the most recent version of a compatible component is added to the desired image of the virtualization software at step 924.

For some enabled solutions (e.g., VC version 7.5), the required components may already be included in the image of the virtualization software. For example, the ESXi component is one of the components of the base image. In such cases, the test for compatibility is whether or not the enabled solution is compatible with the current version of the base image, and the constraints file of such a solution specifies a range of base image versions that are compatible. For example, in constraints file 723 for VC version 7.5, the range of compatible base image versions is specified as greater than or equal to 7.0 and less than or equal to 7.5.

If the test for compatibility fails (step 918, No), image manager 122 at step 920 issues an error message indicating that the solution cannot be enabled. The error message may include guidance for resolving the error (e.g., recommending the end user to select another version of the solution because a component required by the currently selected version of the solution is not compatible with the current version of the base image). If the test for compatibility passes (step 918, Yes), image manager 122 at step 922 determines if all components required by the solution are already in the desired image of the virtualization software. If it is not (step 922, No), image manager 122 at step 924 adds all of the components required by the solution to the desired image of the virtualization software and thereafter executes step 926. If all components required by the solution are already in the desired image of the virtualization software (step 922, Yes), image manager 122 skips step 924 and executes step 926.

At step 926, image manager 122 checks to see if all enabled solutions have been processed. If not, the flow returns to step 912 where image manager 122 selects another enabled solution for processing. If all enabled solutions have been processed, the method ends.

Figure 10:
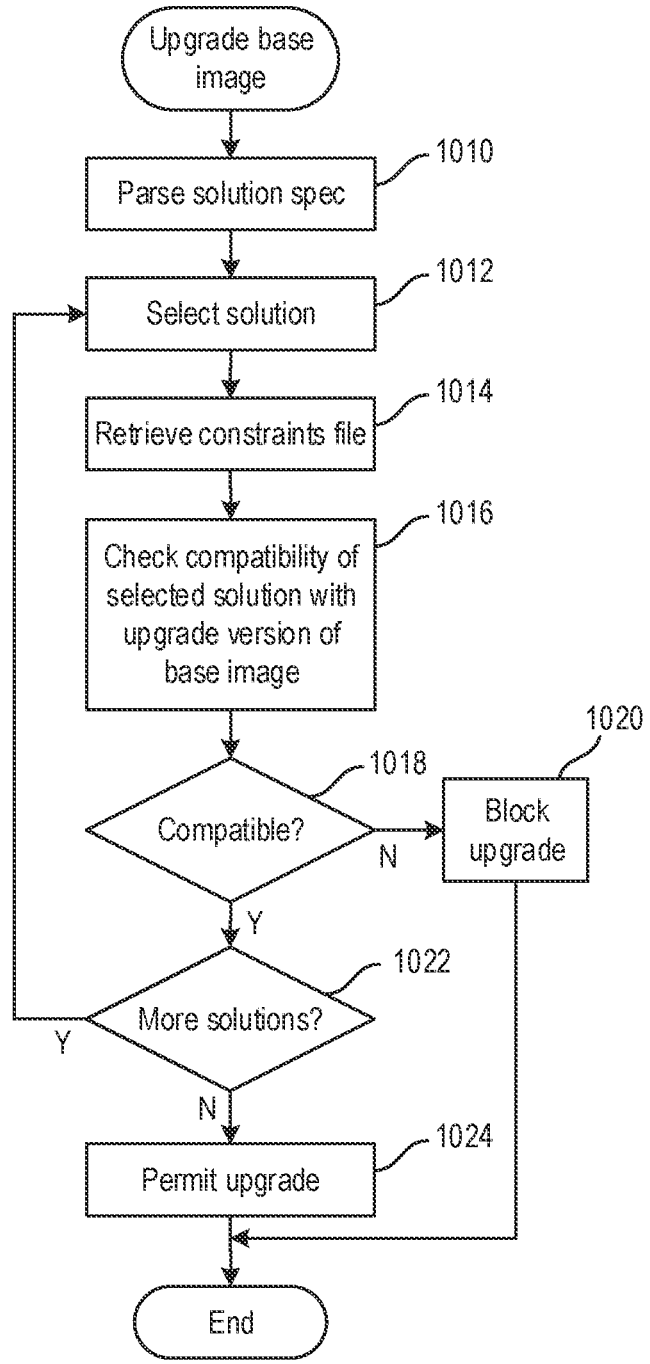
FIG. 10 is a flow diagram that depicts steps of a method for checking for compatibility of installed solution components during an upgrade of a virtualization software.

FIG. 10 is a flow diagram that depicts steps of a method for checking for compatibility of installed solution components during an upgrade of a virtualization software. This method is executed by image manager 112 when the end user expresses a desire to upgrade the base image of the virtualization software (e.g., in response to the end user selecting base image version 7.1 on UI 101 when base image version 7.0 is currently selected), and thus before the upgraded base image is applied onto the hosts. This method is also executed by image manager 112 when the end user expresses a desire to upgrade any other portion of the virtualization software.

The method of FIG. 10 begins with step 1010, where image manager 112 retrieves software specification 105 and parses the solution section of software specification 105 to identify the solutions that the end user has enabled and one or more components of the enabled solutions that need to be included in the image of the virtualization software.

Then, step 1012 and the steps following step 1012 are executed for each enabled solution identified in step 1010. Image manager 112 at step 1012 selects one of the enabled solutions and at step 1014 retrieves the constraints file associated with the selected solution. Then, image manager 112 checks to see if the selected solution will remain compatible with the upgraded image of the virtualization software (step 1016). In the embodiments, a solution will become incompatible with the upgraded image of the virtualization software in one of two ways. First, a version of the solution's component, which is part of the current image of the virtualization software is not compatible with the upgraded image of the virtualization software. Second, a solution requires a version of the base image to be in a certain range of versions and an upgrade version of the base image falls outside that range. Image manager 112 performs the compatibility check against the upgrade version of the base image in the manner described above for step 916 and against the upgraded image of the virtualization software using the method depicted in FIG. 4.

If the selected solution is not compatible (step 1018, No), image manager 122 at step 1020 blocks the upgrade and the method ends thereafter. If the selected solution is compatible (step 1018, Yes), image manager 122 at step 1022 checks to see if all enabled solutions have been processed. If not, the flow returns to step 1012 where image manager 122 selects another enabled solution for processing. If all enabled solutions have been processed, image manager 122 at step 1024 permits the upgrade and the method ends thereafter.

Figure 11:
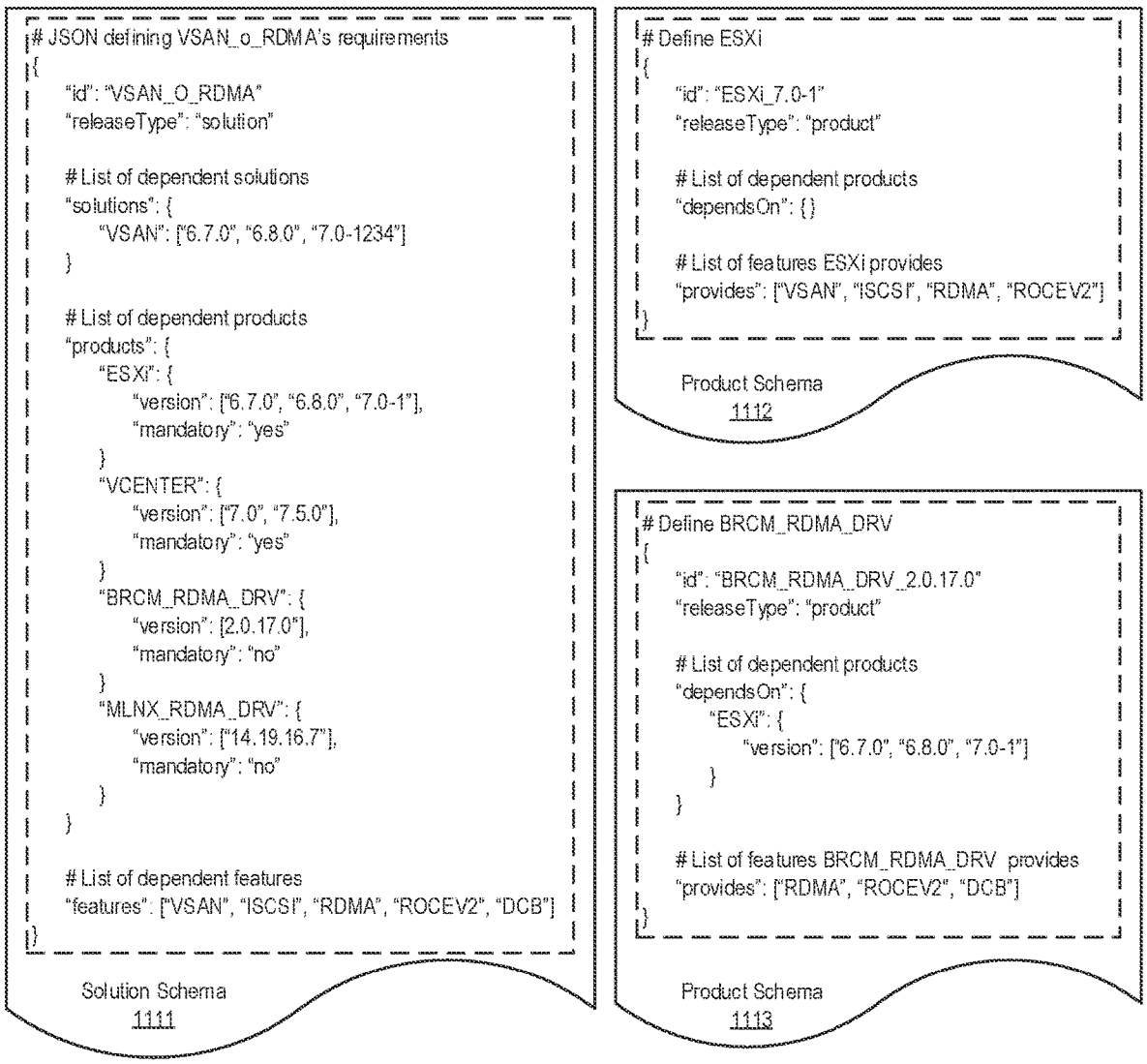
FIG. 11 illustrates examples of a solution schema and product schemas.

FIG. 11 illustrates examples of a solution schema and product schemas. When a solution is created, the solution developer creates a solution schema that is published in image depot 120. A solution schema for a particular solution lists products and software features that are required by the solution. The solution schema may also list other solutions that are required by the solution. Other solutions required by the solution are referred to as dependent solutions and each dependent solution has a corresponding solution schema. Products, as used herein, are software and each product has a corresponding product schema. Some products are parts of the virtualization software, and a product that is a part of the virtualization software may be in the form of a component as defined above. As used herein, products that are required by a solution (or by another product as described below) are referred to as dependent products, and software features that are required by a solution are referred to as dependent features.

Solution schema 1111 is a solution schema for the VSAN_O_RDMA (short for "VSAN over RDMA") solution. This solution requires the VSAN solution (version 6.7.0, 6.8.0 or 7.0-1234), four dependent products, two of which are mandatory, and the following dependent features: VSAN, ISCSI, RDMA, ROCEV2, and DCB. Each version of the VSAN solution has a corresponding solution schema (not shown), and each version of the dependent products has a corresponding product schema. Product schemas of the ESXi product 7.0-1 and the BRCM_RDMA_DRV product are shown in FIG. 11 as product schema 1112 and product schema 1113, respectively.

When a version of a product is created, the product developer creates a product schema that is published in image depot 120. A product schema for a particular product lists software features that are provided by the product. The product schema may also list other products that are required by the product. Other products required by the product are referred to as dependent products and each dependent product has a corresponding product schema. Product schema 1112 shows no dependent products and that the following software features are provided: VSAN, ISCSI, RDMA, and ROCEV2. Product schema 1113 shows one dependent product, the ESXi product (version 6.7.0, 6.8.0 or 7.0-12), and that the following software features are provided: RDMA, ROCEV2, and DCB.

In the embodiments, tags of three different types (solution tags, product tags, and feature tags) are employed to simplify the tracking of software features that are provided by the different products that make up a solution and software features that are provided by different solutions by way of the products included therein. Each tag is a keyword that is associated with a particular version of a solution, a particular version of a product, or a particular feature. Each "feature tag" is associated with a particular feature, each "product tag" with a particular product version, and each "solution tag" with a particular solution version.

When a product schema of a particular product version is published in image depot 120, solutions manager 113 parses the product schema and "tags" this product version with feature tags corresponding to software features provided by this product version by updating tag database 161 to associate this product version with the feature tags of the software features provided by this product version.

Figure 12:
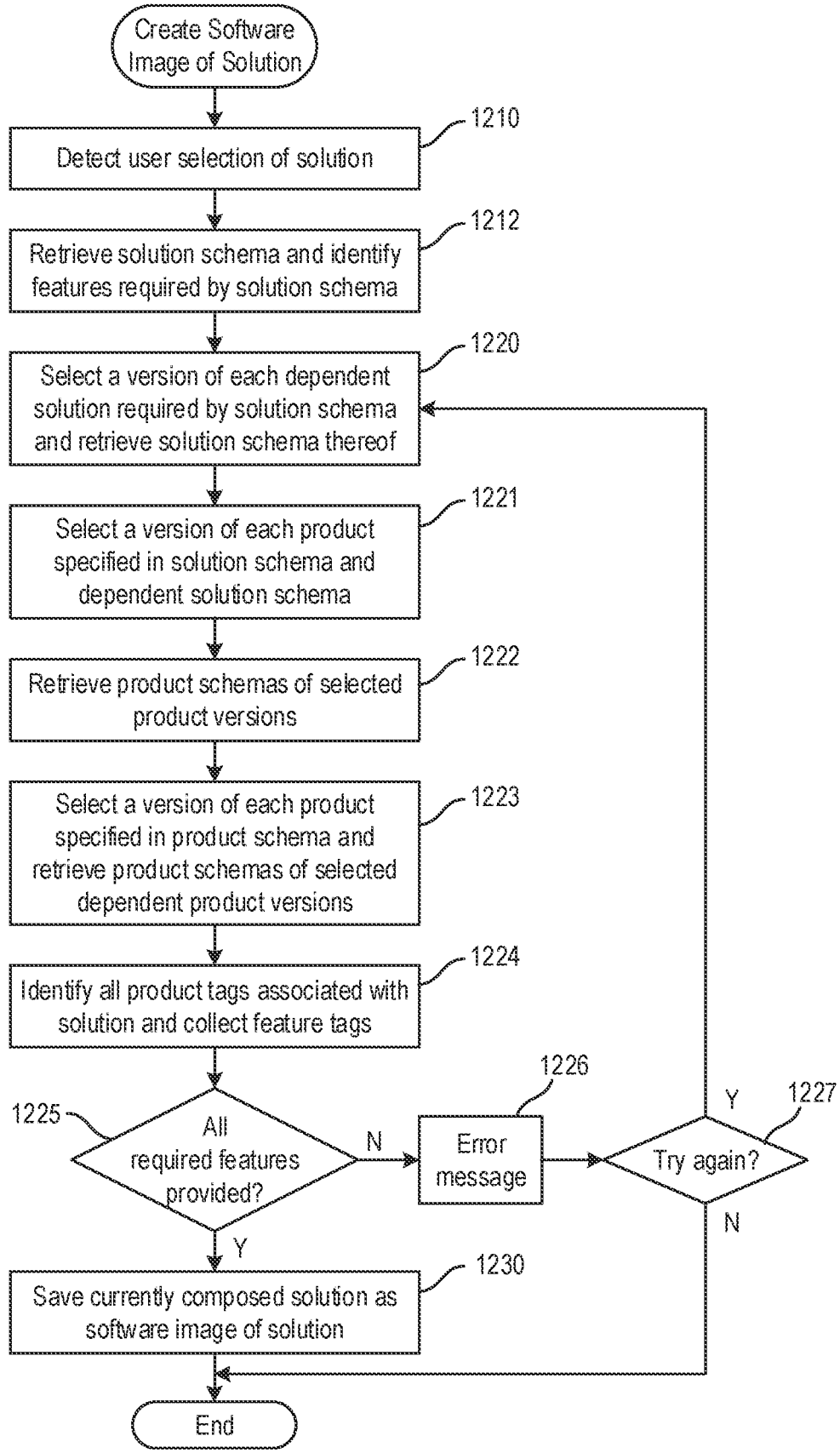
FIG. 12 is a flow diagram that depicts steps of a method for creating a software image of a solution according to an embodiment.

FIG. 12 is a flow diagram that depicts steps of a method for creating a software image of a solution according to an embodiment. This method is carried out by solutions manager 113 and begins at step 1210 when solutions manager 113 detects that a user has selected a particular solution through solutions UI 102. In response to the detection, solutions manager 113 at step 1212 retrieves the solution schema corresponding to the selected solution and identifies the software features required by the solution schema.

Solutions manager 113 carries out steps 1220-1227 to select particular versions of dependent solutions and products (hereinafter referred to as "selected dependent solution versions" and "selected dependent product versions"), among those specified by the solution schema as well as those specified by the solution schema of dependent solution versions and the product schemas of dependent product versions, that can provide the software features that are required by the solution schema.

At step 1220, solutions manager 113 selects a version of a dependent solution among those specified by the solution schema, and retrieves the solution schema of the selected dependent solution version. Upon making this selection, solutions manager 113 also "tags" the solution with the solution tag corresponding to the dependent solution version by updating tag database 161 to indicate an association between the solution (the object being tagged) and the dependent solution version (the object represented by the solution tag).

Then, solutions manager 113 at step 1221 selects a version of each dependent product, among those specified by the solution schemas of the solution and the dependent solution version, and at step 1222 retrieves product schemas of the selected dependent product versions. Upon making these selections, solutions manager 113 also "tags" the corresponding solution or dependent solution version with the product tag corresponding to the dependent product version by updating tag database 161 to indicate an association between the solution or the dependent solution version (the object being tagged) and the dependent product version (the object represented by the product tag).

A product schema may also specify other products as dependent products. In such a case, step 1223 is executed, at which solutions manager 113 selects a version of each dependent product, among those specified by the product schema, and retrieves the product schemas of the dependent product versions. Upon making this selection, solutions manager 113 also "tags" the corresponding product with the product tag corresponding to the dependent product version by updating tag database 161 to indicate an association between the product (the object being tagged) and the dependent product version (the object represented by the product tag).

At step 1224, solutions manager 113 examines tag database 161 to identify all product tags associated with the solution. Tag database 161 may indicate a direct association between the solution and the product represented by the product tag, or may indicate an association between the solution and the product represented by the product tag through: (1) another solution, (2) one or more other products, or (3) another solution and one or more other products. After all associated product tags have been identified, solutions manager 113 collects all feature tags applied to the products represented by these product tags.

The software features corresponding to the feature tags that are collected at step 1224 represent the software features that are provided by the currently composed solution made up of selections of the dependent solution version and the dependent product versions. If solutions manager 113 at step 1225 determines that all software features required by the solution schema (and identified at step 1212) are provided by the currently composed solution, step 1230 is executed, where solutions manager 113 saves the currently composed solution as the software image of the solution in solutions depot 162. If, on the other hand, solutions manager 113 determines at step 1225 that all software features required by the solution schema (and identified at step 1212) are not provided by the currently composed solution, step 1226 is executed, where solutions manager 113 issues an error message indicating software features that are missing and prompts the end user to try again at step 1227. If the end user enters an input to try again, solutions manager 113 returns to step 1220. If the end user enters an input to not try again, solutions manager 113 terminates the process.

The selection of the different versions of dependent solutions and dependent products may be made in any manner. In one embodiment, the highest (or most recent) version is selected first and in subsequent passes through step 1220, the next highest (or most recent) version is selected.

Figure 13:
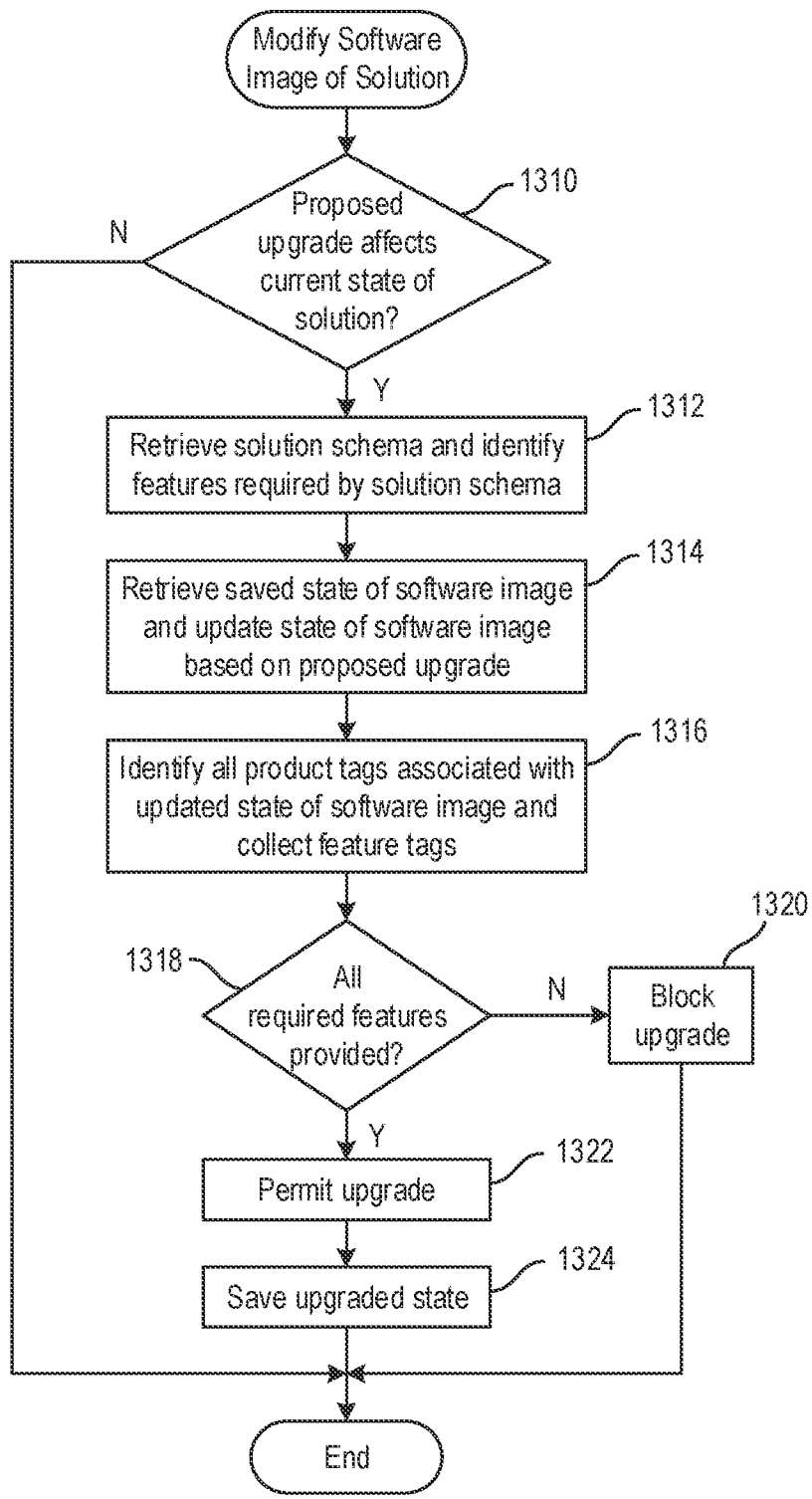
FIG. 13 is a flow diagram that depicts steps of a method for modifying a software image of a solution according to an embodiment.

FIG. 13 is a flow diagram that depicts steps of a method for modifying a software image of a solution according to an embodiment. The software image of the solution may be modified as a result of proposed software upgrade to any of the products that are part of the software image of the solution.

If solutions manager 113 determines at step 1310 that a proposed software upgrade does not affect the current state of the solution, solutions manager 113 terminates the process. If, on the other hand, solutions manager 113 determines at step 1310 that a proposed software upgrade does affect the current state of the solution, solutions manager 113 executes step 1312, at which solutions manager 113 retrieves the solution schema corresponding to the solution and identifies the software features required by the solution schema.

At step 1314, solutions manager 113 retrieves the saved state of the software image from solutions depot 162 and updates the saved state based on the proposed software upgrade. For example, referring to FIG. 11, the proposed software upgrade may be to the ESXi product, from version 7.0-1 to version 7.5.

At step 1316, solutions manager 113 examines tag database 161 to identify all product tags associated with the upgraded state of the solution. As described above, tag database 161 may indicate a direct association between the solution and the product represented by the product tag, or may indicate an association between the solution and the product represented by the product tag through: (1) another solution, (2) one or more other products, or (3) another solution and one or more other products. After all product tags associated with the upgraded state of the solution have been identified, solutions manager 113 collects all feature tags applied to the products represented by these product tags.

The software features corresponding to the feature tags that are collected at step 1316 represent the software features that are provided by the upgraded state of the solution. If solutions manager 113 at step 1318 determines that all software features required by the solution schema (and identified at step 1312) are provided by the upgraded state of the solution, solutions manager 113 at step 1322 permits the proposed software upgrade, and at step 1324 saves the upgrade state of the solution as the software image of the solution in solutions depot 162. If, on the other hand, solutions manager 113 determines at step 1318 that all software features required by the solution schema (and identified at step 1312) are not provided by the upgraded state of the solution, solutions manager 113 at step 1320 blocks the proposed software upgrade and terminates the process.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of creating a software image of a solution to be deployed in a virtualized computing environment, said method comprising:
    retrieving a schema of the solution and determining from the schema software products that are required by the solution and software features that are required by the solution, the software products including at least a first software product and a second software product;
    selecting a version of the first software product to include in the solution;
    for each of the other software products, which include the second software product, selecting a version of the software product to include in the solution;
    identifying software features provided by the selected version of the first software product and by the selected versions of the other software products; and
    upon confirming that the selected versions of the software products provide all of the software features that are required, creating the software image of the solution that includes the selected version of each of the software products, and saving the software image in a storage device for deployment in the virtualized computing environment,
    wherein at least one of the software products is a component of a virtualization software that is installed in hosts of the virtualized computing environment, and part of the software image of the solution is to be deployed onto the hosts of the virtualized computing environment.

2. The method of claim 1, further comprising:
    selecting a version of a dependent solution that is required by the solution;
    retrieving a schema of the dependent solution; and determining from the retrieved schema of the dependent solution, software products that are required by the dependent solution, wherein the software products that are required by the solution include the software products that are required by the dependent solution.

3. The method of claim 2, further comprising:

retrieving a schema of the first software product; and determining from the retrieved schema of the first software product, a dependent software product that is required by the first software product, wherein the software products that are required by the solution include the dependent software product that is required by the first software product.

4. The method of claim 1, further comprising:

creating feature tags for each of the different software features and product tags for each version of the software products;

applying to each version of the software products, feature tags corresponding to software features provided by said each version of the software products;

applying to the solution, product tags corresponding to the selected versions of the software products required by the solution;

collecting all feature tags applied to the versions of the software products corresponding to the product tags that have been applied to the solution; and comparing the software features corresponding to the collected feature tags against the software features that are required in confirming that the selected versions of the software products provide all of the software features that are required.

5. The method of claim 1, further comprising:

upon confirming that the selected versions of the software products do not provide all of the software features that are required, for each software product, selecting another version of the software product to include in the solution and identifying software features provided by said another version of the software product.

6. The method of claim 5, wherein the selected versions of the software products are more recent versions of the software products relative to said another versions of the software products.

7. A method of updating a software image of a solution that has been deployed in a virtualized computing environment in response to a proposed software upgrade, said method comprising:

upon detecting the proposed software upgrade, retrieving a schema of the solution and determining from the schema software features that are required by the solution, and retrieving a state of the software image of the solution that has been deployed in the virtualized computing environment;

updating the state of the software image of the solution based on the proposed software upgrade and identifying software features provided by the updated state of the software image; and upon confirming that the updated state of the software image provides all of the software features that are required, permitting the proposed software upgrade and saving the updated state of the software image in a storage device, wherein the state of the software image includes a version of a first software product and a version of a second software product, which are required by the solution, and the proposed software upgrade is a proposed upgrade to the first software product, wherein at least one of the software products is a component of a virtualization software that is installed in hosts of the virtualized computing environment, and part of the software image of the solution is deployed onto the hosts of the virtualized computing environment.

8. The method of claim 7, further comprising:

upon confirming that the updated software image does not provide all of the software features that are required, blocking the proposed software upgrade.

9. The method of claim 7, further comprising:

creating feature tags for each of the different software features and product tags for each version of the software products;

applying to each version of the software products, feature tags corresponding to software features provided by said each version of the software products;

applying to the solution; product tags corresponding to the versions of the software products that are in the updated software image of the solution;

collecting all feature tags applied to the versions of the software products corresponding to the product tags that have been applied to the solution; and comparing the software features corresponding to the collected feature tags against the software features that are required in confirming that the updated software image of the solution provides all of the software features that are required.

10. A virtualized computing system comprising:

a plurality of hosts onto each of which a virtualization software is to be deployed;

a management server for the hosts; and a storage device, wherein the management server includes a processor that is programmed to carry out a method of creating a software image of a solution to be deployed in the virtualized computing system, said method comprising:

retrieving a schema of the solution and determining from the schema software products that are required by the solution and software features that are required by the solution, the software products including at least a first software product and a second software product;

selecting a version of the first software product to include in the solution;

for each of the other software products, which include the second software product, selecting a version of the software product to include in the solution;

identifying software features provided by the selected version of the first software product and by the selected versions of the other software products; and upon confirming that the selected versions of the software products provide all of the software features that are required, creating the software image of the solution that includes the selected version of each of the software products, and saving the software image in the storage device for deployment in the virtualized computing system, wherein at least one of the software products is a component of the virtualization software, and part of the software image of the solution is to be deployed onto the hosts.

11. The virtualized computing system of claim 10, Wherein feature tags are created for each of the different software features and product tags are created for each version of the software products, and said method further comprises:

applying to each version of the software products, feature tags corresponding to software features provided by said each version of the software products;

applying to the solution, product tags corresponding to the selected versions of the software products required by the solution;

collecting all feature tags applied to the versions of the software products corresponding to the product tags that have been applied to the solution; and comparing the software features corresponding to the collected feature tags against the software features that are required in confirming that the selected versions of the software products provide all of the software features that are required.

12. The virtualized computing system of claim 10, wherein the method further comprises:

upon confirming that the selected versions of the software products do not provide all of the software features that are required, for each software product, selecting another version of the software product to include in the solution and identifying software features provided by said another version of the software product.

13. The virtualized computing system of claim 12; wherein the selected versions of the software products are more recent versions of the software products relative to said another versions of the software products.

14. The virtualized computing system of claim 10, wherein the processor of the management server is programmed to carry Gut another method comprising:

upon detecting a proposed software upgrade, retrieving the schema of the solution and determining from the schema the software features that are required by the solution, and retrieving the software image of the solution from the storage device;

updating the software image of the solution based on the proposed software upgrade and identifying software features provided by the updated software image; and upon confirming that the updated software image provides all of the software features that are required, permitting the proposed software upgrade and saving the updated software image in the storage device for deployment in the virtualized computing system.

15. The virtualized computing system of claim 14, wherein said another method further comprises:

upon confirming that the updated software image does not provide all of the software features that are required, blocking the proposed software upgrade.

16. The virtualized computing system of claim 14, wherein the software image of the solution includes versions of software products that are required by the solution, and the proposed software upgrade is a proposed upgrade to one of the software products.

\* \* \* \* \*